United States Patent [19]

Hicks, Jr.

[11] Patent Number: 4,579,571
[45] Date of Patent: Apr. 1, 1986

[54] METHOD FOR FABRICATING OPTICAL FIBER PREFORMS

[75] Inventor: John W. Hicks, Jr., Northboro, Mass.

[73] Assignee: Polaroid Corporation, Cambridge, Mass.

[21] Appl. No.: 658,504

[22] Filed: Oct. 9, 1984

[51] Int. Cl.⁴ .......................................... C03B 37/018
[52] U.S. Cl. .............................. 65/3.12; 65/DIG. 16
[58] Field of Search ............... 65/DIG. 16, 3.12, 18.2, 65/3.11

[56] References Cited

U.S. PATENT DOCUMENTS

| | | | |
|---|---|---|---|
| 3,864,113 | 2/1975 | Dumbaugh | 65/18.2 |
| 4,065,280 | 12/1977 | Kao et al. | 65/3 |
| 4,082,420 | 4/1978 | Shiraishi et al. | 350/96.31 |
| 4,210,386 | 7/1980 | Araujo et al. | 350/96.31 |
| 4,283,213 | 8/1981 | Akers | 65/3.11 |
| 4,441,788 | 4/1984 | Guerder et al. | 350/96.34 |

FOREIGN PATENT DOCUMENTS

| | | | |
|---|---|---|---|
| 2428618 | 2/1980 | France | 65/DIG. 16 |
| 54-134721 | 10/1979 | Japan | 65/18.2 |
| 55-67533 | 5/1980 | Japan | 65/DIG. 16 |
| 56-50136 | 5/1981 | Japan | 65/18.2 |

OTHER PUBLICATIONS

Proceedings of the Optical Fiber Conference, New Orleans, 1/1984; Abstracts MG4–MG6.

*Primary Examiner*—Kenneth M. Schor
*Attorney, Agent, or Firm*—Francis J. Caufield

[57] ABSTRACT

A method for fabricating preforms for drawing into single mode optical fibers having core and cladding doped with different amounts fluorine. A pure fused silica start rod is first coated with a layer of soot which is then dehydrated, doped with a first level of fluorine, and then consolidated. This structure, which is an intermediate preform, is then drawn down until its area weighted average index of refraction is such that it would perform as a core in a fiber. If not, it is recoated and drawn down further until it will behave as a core upon further reduction in size. The intermediate preform is then recoated with another layer doped with a higher concentration of fluorine so that it will act as a cladding layer over the first fluorinated layer whose index is higher because of a lower concentration of fluorine. This final structure serves as a preform from which the desired fiber can be drawn.

10 Claims, 4 Drawing Figures

METHOD FOR FABRICATING OPTICAL FIBER PREFORMS

BACKGROUND OF THE INVENTION

This invention in general relates to dielectric waveguides, and in particular to a method for fabricating glass preforms from which optical communications fibers can be drawn.

The use of optical fiber as a medium for transmitting high volumes of information over large distances is now a well-established practice known throughout the communications industry. In fact, the performance of optical fibers has improved so steadily since the possibility of their use for communications purposes became evident in 1966 that some believe that they could displace conventional copper wire based systems as early as the turn of the century. This rapid progress has been due largely to developments in materials identification and in methods for fabricating fiber.

Optical fibers are thin filaments of glass having a central region of high index of refraction, or high effective index of refraction where the index varies, surrounded by a sheath or cladding region of lower index, a structure which causes optical radiation properly injected into the fiber end to propagate along the length of the fiber and emerge from the distant end.

The performance of optical fibers for communications is chiefly determined by optical loss or attenuation and by dispersion. Losses are caused by absorption, scattering, and imperfect geometry or structural defects and dispersion, which causes a smearing of light pulses leading to noise, is of two types. One type of dispersion is a change in refractive index with wavelength due to the material itself, and the other is referred to as modal dispersion which is due to differences in the optical path lengths for different transmission modes.

For optical fibers to be competitive with copper wire based systems in transmitting high data rates over long distances, they must have low transmission losses and produce but low signal distortion. In order to obtain such high quality optical fibers, extremely pure glasses are required since even traces of certain impurities such as Fe or Cu increase the attenuation drastically. And, in order to have wide band transmission, it is necessary to carefully control the refractive index profile and the material dispersion in the fiber since it determines in large part the distortion of the signals transmitted along the fiber.

To meet these requirements, those skilled in the art have developed various techniques by which optical fibers can be successfully fabricated. These techniques are, by and large, based upon the formation of silica based glass from appropriate glass precursor vapors. Techniques used have been the soot process (U.S. Pat. No. 3,711,262 and U.S. Pat. No. Re. 28,029); the modified chemical vapor deposition process (U.S. Pat. No. 4,217,027); and the vapor axial deposition process (U.S. Pat. Nos. 3,966,446; 4,135,901 and 4,224,046). As a result of these processes and improvements to them, optical fibers are now routinely fabricated in commercial processes with losses less than two db/km in certain parts of the optical region of the spectrum.

One example of a significant improvement over processes which relied on the external deposition of soots from vapor phase precursors to form preforms from which fibers are drawn was to reduce the inherent hydroxyl ion (OH) content to levels sufficiently low not to present a problem of undue absorption in the wavelength regions of interest. Prior to this improvement, it was known that a successful fiber of low attenuation required that the hydroxyl ion content had to be below a few parts per million because of the existance of undesirable OH absorption at overtones of the fundamental stretching vibration of OH which centered around 2.8 microns. These overtones give rise to absorptions at 1.4 microns and 970 and 750 nm and thus interfere with a transmission band of interest in glass. Thus, the OH ion which was ever present in such processes had to be precluded from the final fiber if low transmission losses were to be achieved. The elimination of the OH ion was a particularly vexing problem for the industry because of its presence in undesirable quantities in most of the vapor phase processes. To solve this problem, chlorine has been used as a drying agent to remove the OH ion from preforms made from flame hydrolysis as shown and described in U.S. Pat. No. 3,933,454. Fluorine has also been proposed as a drying agent as shown and described in U.S. Pat. No. 4,065,280 and as a dopant in a fiber for purposes of reducing hydroxyl ion content as shown and described, for example, in U.S. Pat. No. 4,441,788. In addition, fluorine has been used to reduce cladding index (U.S. Pat. No. 4,082,420).

To improve transmission bandwidth, those skilled in the art chose to use single mode fibers rather than multimode fibers because the use of single mode fibers eliminated or virtually eliminated dispersion manifested as pulse spreading due to differences in optical path length between the various modes propagating in a multimode fiber and to material dispersion as well.

Initial fabrication of single mode fibers was of the step index type in which the core was of uniform index of refraction and the cladding was primarily of a uniform lower index of refraction. Early fibers comprised silica cores with doped claddings of, for example, borosilicate and later fluorosilicate. Later fibers included undoped cores of, for example, germania silicate and silica claddings. However, these designs presented manufacturing problems because of the high temperatures necessary to process deposited pure silica.

The later fibers included germania silicate cores and phosphosilicate claddings. Phosphorus in the cladding simplifies the manufacturing process because it lowers the melting temperature of silica. Furthermore, the removal of boron from the fiber, whose presence likewise simplifies manufacturing due to lowered melting temperatures, avoids the relatively low wavelength infrared absorption edge associated with borosilicate glasses.

In spite of the many innovations made in this art, improved fiber material structures and manufacturing processes are still needed to assure low loss and low dispersion which, in turn, translate into long distances between repeaters and to high telecommunications capacity. Accordingly, it is a primary object of the present invention to provide a method for fabricating preforms from which single mode optical fiber of low attenuation and dispersion and favorable characteristics for fabrication can be drawn.

It is another object of the present invention to provide an efficient method by which high volumes of fiber can be drawn.

Other objects of the invention will, in part, be obvious and will, in part, appear hereinafter. The invention accordingly comprises the steps exemplified in the detailed disclosure which follows.

SUMMARY OF THE INVENTION

This invention in general relates to the fabrication of optical fibers suitable for communications applications and in particular to a method for efficiently fabricating preforms from which such optical fibers can be drawn.

The method of the invention for fabricating such preforms begins with depositing a porous soot of high purity silicon dioxide on a starting rod, preferably of pure fused silica. This soot is then dehydrated and afterwords exposed to an atmosphere containing fluorine to further reduce its water content and fill its pores with fluorine. The soot is then consolidated to a solid layer of fluorine doped silicon dioxide over the starting rod to form an intermediate preform.

This intermediate preform is then reduced in cross-sectional area by drawing until the area weighted average index of refraction of the material of the starting rod and that of the solid fluorinated layer reaches a value which would allow the intermediate preform, once drawn down to core size and surrounded by an appropriate cladding, to function as a fiber core. In this size reduction, several redraws may be needed thus requiring that additional solid fluorinated layers be added to arrive at the correct cross-sectional geometry which satisfies the index value needed for a core. Obviously, these added layers are to be laid down in the same manner as the first layer, and the process, instead of yielding only one intermediate preform, leads to a number of them depending on specific mechanical constraints.

Each intermediate preform is then provided with at least one other layer of soot that is deyhdrated, doped with fluorine and consolidated as before except that the second level of fluorine doping is higher so as to reduce the other layer index of refraction below that of the intermediate preform so that, when the final preform in drawn into a single mode fiber geometry, propagation will be supported.

BRIEF DESCRIPTION OF THE DRAWINGS

The novel features that are considered characteristic of the invention are set forth with particularity in the appended claims. The invention itself, however, both as to its steps and sequence of operation, together with other objects and advantages thereof, will be best understood from the following description of the illustrated method when read in connection with the accompanying drawings wherein like numbers have been employed in the different figures to denote the same parts and wherein:

DETAILED DESCRIPTION

This invention relates to a method for efficiently fabricating preforms from which optical fibers, particularly those doped with fluorine, can be drawn.

Figure 1:
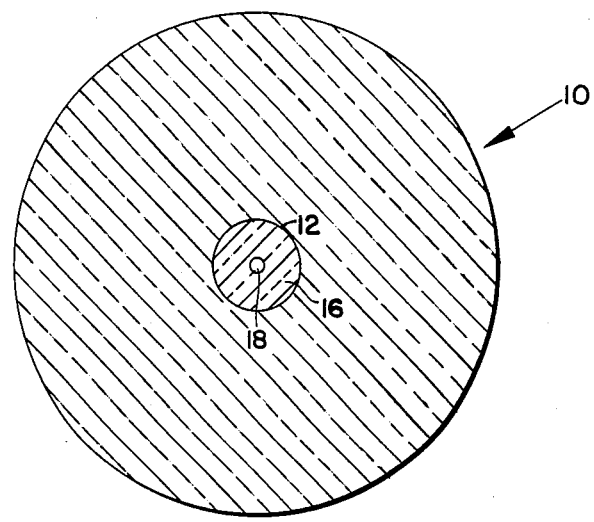
FIG. 1 is an enlarged diagrammatic cross-section of the structure of an optical fiber which can be fabricated using the method of the present invention.

An example of a single mode, fluorine doped optical fiber that the method of the present invention is particularly useful in fabricating is shown in cross-section of FIG. 1 where the fiber is designated at 10. As seen there, the fiber 10 comprises a core 12 surrounded by a cladding 14. The core, in turn, includes an outer thick layer 16 which surrounds a central region 18 that is very small compared to the layer 16. The area weighted average index of refraction of the layer 16 and the central region 18 is a predetermined value selected in a well-known manner to be higher than that of the cladding 14 so that the fiber 10 supports single mode propagation at its operating wavelength which nominally is preferably at 1.34 micrometers more or less.

At the preferred operating wavelength of 1.34 micrometers, the average index of refraction of the core 12 is preferably between 1.4454 and 1.4446 while the cladding index is lower by between 0.0035 and 0.0069 index units such that the numerical aperture of the fiber 10 is between 0.1 and 0.2.

The nominal core diameter is approximately 8.0 micrometers while that of the cladding 14 is approximately 125 micrometers more or less.

Fiber 10 is drawn in a conventional manner from a preform that is fabricated utilizing the method to be described such that its core and cladding (12 and 14) are substantially free of hydroxyl ions, its viscosity is low so that it can be drawn at low temperatures, and its material dispersion is small.

The composition of the core thick outer layer 16 is pure fused silica lightly doped with fluorine to reduce its hydroxyl ion content, lower its viscosity, and minimize its material dispersion. For these purposes, the amount of fluorine present in the outer layer 16 is preferably within the range of 0.2 to 0.4 mole percent. The core central region 18 is quite small, a micrometer or less, and is preferably composed of pure fused silica.

For the preferred range of index of the cladding 14, its material composition is also of pure fused silica containing a base level of fluorine, within the range of 0.2 to 0.4 mole percent, and an additional level between the range of 0.8 and 1.61 mole percent. The base level is there for the same reasons that the same amount of fluorine is added to the core layer 16, and the additional level is present to reduce the index of refraction to be within the preferred range.

Figure 2:
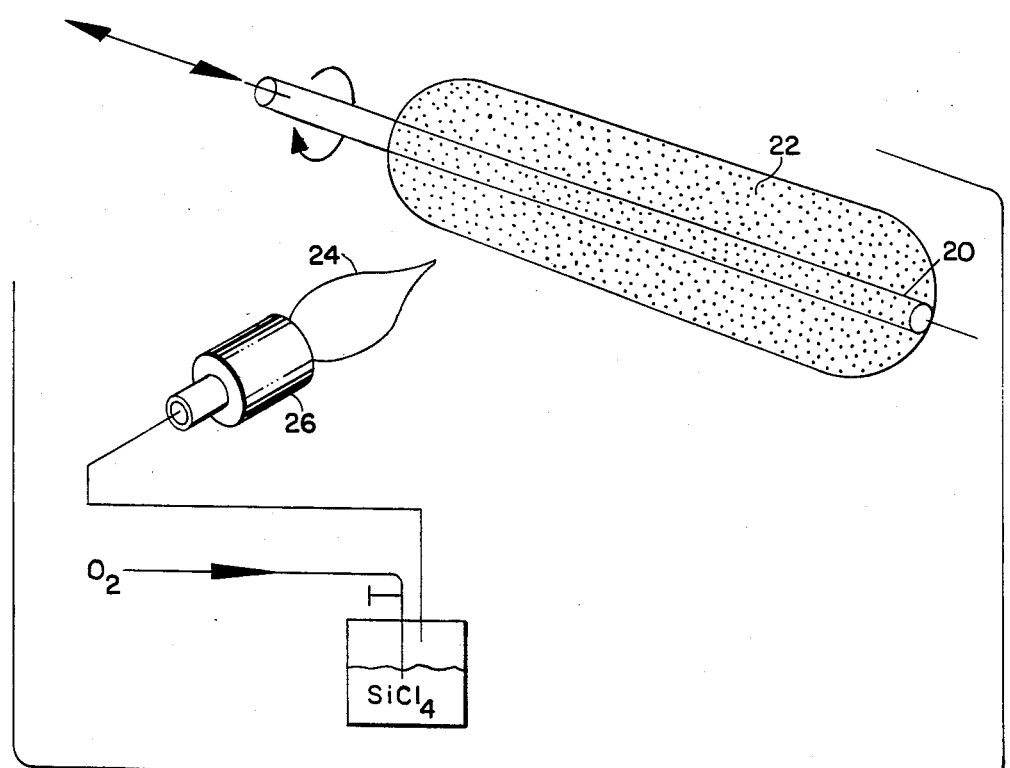
FIG. 2 is a diagrammatic perspective which illustrates apparatus by which a step of the inventive method can be practiced.
Figure 3:
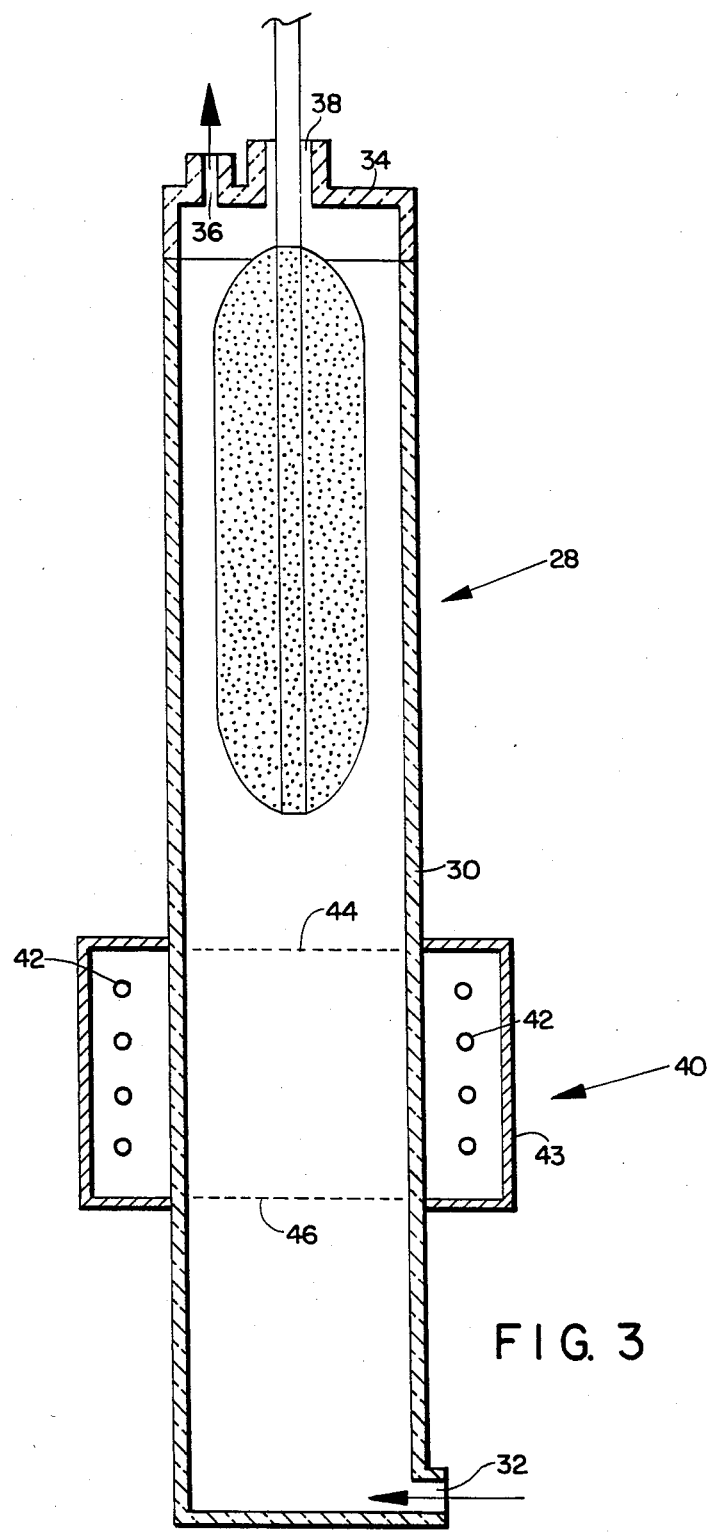
FIG. 3 is a diagrammatic cross-sectional elevation illustrating apparatus useful in carrying out other steps of the invention.
Figure 4:
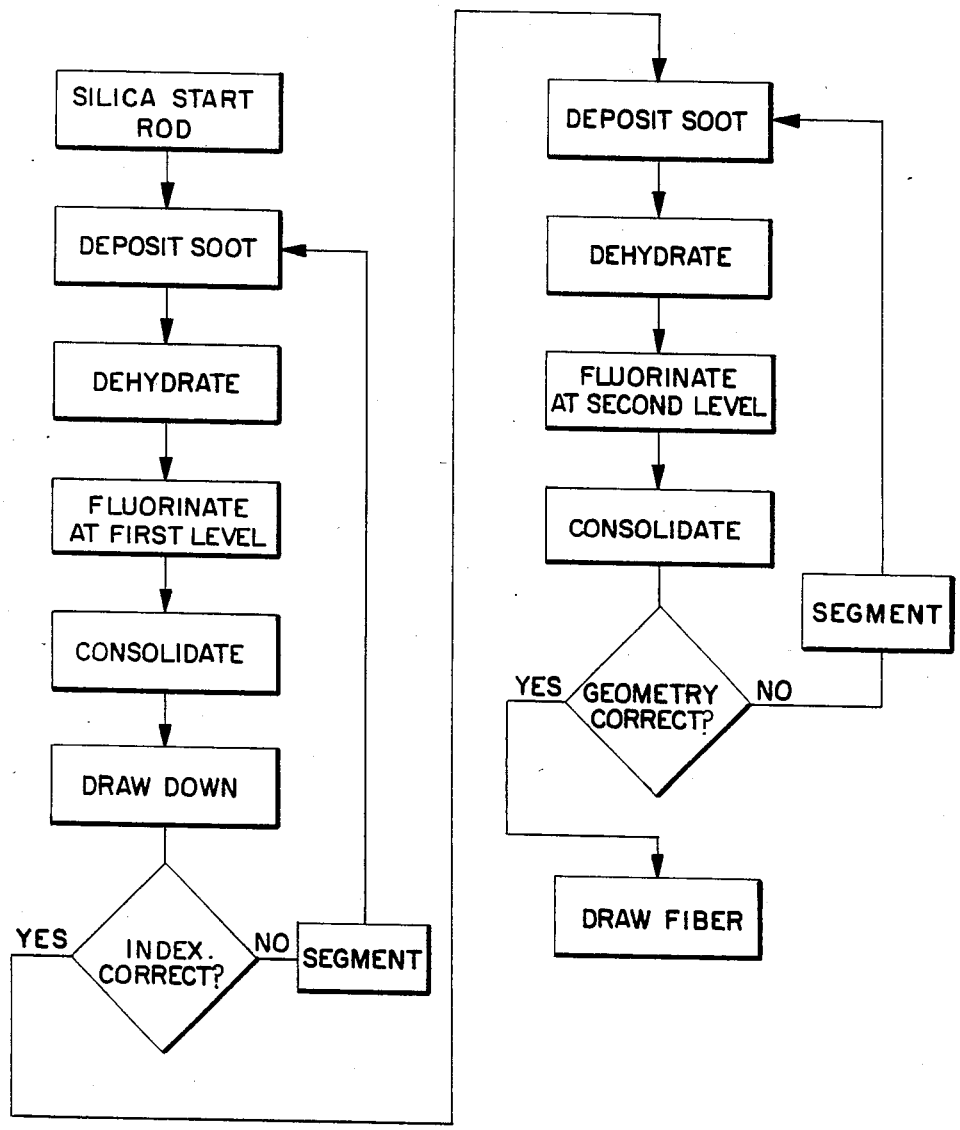
FIG. 4 is a flow chart showing various steps of the inventive method.

The method to be used to fabricated a preform or, more correctly, a plurality of preforms from which the fiber 10 can be drawn may best be understood by referring now to FIGS. 2, 3 and 4.

The method begins by first supporting a starting rod 20, preferably of pure fused silica of low water content, for rotation about and translation along its longitudinal axis. The diameter of the starting rod 20 is conveniently 5 millimeters, but may be some other size if required.

Next, a porous soot 22 of silicon dioxide ($SiO_2$) is deposited on the outside of the starting rod 20 via an outside vapor deposition method (OVD) by burning silicon tetrachloride ($SiCl_4$) in an oxygen-hydrogen flame 24 that is produced in front of a burner nozzle 26 which is directed at the starting rod 20 as it is translated and rotated in a well-controlled way to assure that the porous soot 22 builds up uniformly as a homogeneous mass.

After deposition of the soot 22 to a thickness of several centimeters, the starting rod 20 with the deposited soot is removed and the porous soot, now a cylinder of soot, is placed in a dehydration and consolidation furnace such as that shown at 28 in FIG. 3.

As seen, furnace 28 comprises a capped quartz tube 30 which has a gas inlet 32 at the bottom and a double apertured, removable, cap 34 at its top. One of these apertures in the tube cap 34 (say 36) serves as a gas outlet and preferably is a pressure relief type. Through its other aperture (38) extends the tail end of the starting rod 20 so that it may be manipulated from outside the quartz tube 30 to lower and rotate the soot 22.

A heater 40 with glow bars 42 surrounded by a heat insulating box 43 defined as zone along the quartz tube 30 (between dotted lines 44 and 46) in which the temperature inside of the tube 30 can be elevated and lowered as needed in a controlled and known way.

With the porous soot 22 in the furnace 28, a gas containing chlorine is introduced into the tube 30 and the soot 22 is lowered slowly into the furnace hot zone, bounded by the dotted lines 44 and 46, until the temperature of the soot 22 is within the range of 1,000° C. to 1,200° C. for a predetermined time sufficient to drive out, from end to end, substantially all of its water content.

After this dehydration step, the soot 22 is raised clear of the hot zone and the chlorine flow is stopped. Then fluorine is introduced into the tube 30 by way of a suitable fluorine containing compound or in elemental form ($F_2$) and is diffused throughout the pores of the soot 22 while the soot is again lowered into the furnace through the hot zone slowly from end to end at a temperature of approximately 1,450° C. This step virtually eliminates the hydroxyl ion content of the soot 22. The partially fluorinated (0.1–0.2 mole percent) soot cylinder is then subjected to further heat treatment in a fluorine and helium containing atmosphere to coalesce or sinter the soot cylinder into a solid compacted cylinder without any voids.

This solid compacted cylinder is then an intermediate preform which is then drawn down to reduce the area of the core rod 20 and that of the solid fluorinated layer over it until the area weighted average index of refraction of the two materials is such that the intermediate preform will behave as a single mode fiber core if further drawn down and surrounded by a suitable cladding layer.

If the average index of refraction, because of mechanical limitations, cannot be achieved by drawing down the intermediate preform only once, additional layers of soot may be deposited, dehydrated, fluorinated, and sintered as before until the correct average index is achieved upon drawdown. Of course, this requires cutting up the original intermediate preform into segments and treating each separately until the desired result is achieved. However, nothing is lost in doing this because each segment can be utilized in the further steps of the method.

The intermediate preform or, as the case may be each intermediate preform segment, is then provided with at least one other layer of porous silicon dioxide soot in the manner described above, and this other layer of soot is then dehydrated, doped with fluorine and consolidated as before except that this second level of fluorine doping is higher so that the index of refraction of this other layer is below that of the intermediate preform so that, when this final preform is drawn into a single mode fiber geometry, propagation will be supported.

Having done this, one has a preform or a plurality of preforms from which the fiber 10 can be drawn in a conventional manner.

As an example, one could start with a rod of silica 5 millimeters in diameter and one meter long and then deposit soot until its diameter reached 50 millimeters. This would then be dehydrated, doped with fluorine and consolidated to get a cylinder of 25 millimeter diameter assuming a volume reduction of 2 to 1 from soot to sintered solid.

This is then drawn down by a ratio of 5 to 1 to get (25) one meter long intermediate preforms in which the start rod diameter is 1.0 millimeter and the fluorine doped layer outside diameter is 5 millimeters.

On each one of these, deposit 50 millimeters of soot fluorinated at the cladding level for fluorine and then consolidate as before. These are drawn down again by 5 to 1 to get (25) on meter cylinders each with a 0.2 millimeter diameter start rod center, a 1 millimeter core diameter and a 5 millimeter diameter clad layer.

Each of these then has the clad layer built up as before to, say a 10.0 millimeter diameter and drawn down by a factor of 2 to 1 to get four cylinders with a 0.1 millimeter diameter start rod center, a 0.5 millimeter diameter core and a 5 millimeter clad layer.

Each of these is built up as before so that the clad layer diameter is 12.5 millimeter and drawn down by a 100 to 1 ratio to get 25,000 kilometers of fiber in which the start rod diameter is 1 micrometer, the core is 5 micrometers and the cladding 125 micrometers.

Thus, it can be appreciated by way of the illustrative example that this method efficiently yields a high volume of communications quality fiber.

Moreover, the fiber 10 is comprised of a core which is lightly doped with fluorine and therefore, because of the dehydration properties of fluorine, has a low OH or water content, thereby providing it with extremely low loss characteristics on the order of less than 0.1 db/km at the wavelength at which it will be operated. The small difference in index between the core and the cladding also permits the numerical aperture to be relatively small, thereby maximizing the core size, a desirable property for a single mode fiber. In addition, the cladding also containing fluorine doping is of extremely low loss quality and it is believed that both fluorine cladding and core have low material dispersion characteristics therefore making the structure an ideal candidate for high bandwidth transmission. Moreover, with the relatively large core radius, requiring but a small index difference between core and cladding, the contribution to dispersion due to the waveguide geometry at the operating wavelength is minimized and approaches that due to material dispersion alone which, in this case, is already minimal compared with the base pure fused silica.

It will be obvious to those skilled in the art that other changes may be made in the above-described method without departing from the scope of the invention. Consequently, it is intended that all matter contained in the above description or shown in the accompanying drawings shall be interpreted as illustrative and not in a limiting sense.

What is claimed is:

1. A method of fabricating a glass preform from which optical fibers can be drawn comprising the steps of:

depositing on a starting rod a coating of porous glass soot of homogeneous composition and low water content;

dehydrating said coating of soot to reduce its water content;

fluorinating said coating of soot with a given concentration and partial pressure of fluorine while at an elevated temperature to remove water remaining after said dehydration step and to fill the pores of said soot with fluorine;

consolidating said fluorinated soot on said starting rod to form an intermediate preform with a solid glass layer doped with a predetermined percentage of fluorine;

reducing the cross-sectional area of said intermediate preform and adding additional solid fluorine-containing layers according to the sequence above as required until the area weighted average index of refraction of said starting rod material to said fluorine doped layer, or layers subsequently added to said intermediate preform, is a predetermined value such that said intermediate preform upon further drawing under a predetermined draw down ratio will act as an optical fiber core when surrounded by a cladding having an index of refraction which in combination with said average index will sustain waveguiding action;

depositing on said intermediate preform at least one other coating of porous glass soot of homogeneous composition and low water content;

dehydrating said other coating of soot to reduce its water content;

fluorinating said other coating of soot with a given concentration, lower than said first concentration, and partial pressure of fluorine while at an elevated temperature sufficient to remove any water remaining after dehydrating said other soot coating and to fill the pores of said other soot coating with a level of fluorine which, after consolidation of said final soot, results in a solid fluorinated layer having an index of refraction lower than that of said solid fluorinated layer of said intermediate preform; and consolidating said final soot on said intermediate preform to form over said intermediate preform a solid glass layer whose index of refraction is lower than the area weighted average index of refraction of said intermediate preform.

2. The method of claim 1 wherein both of said dehydrating steps comprise the step of heating said coatings of soot in a chlorine containing atmosphere.

3. The method of claim 2 wherein said heating is sufficient to raise and maintain said soot coatings at a temperature within the range between 1,000° C. and 1,200° C.

4. The method of claim 1 wherein said consolidation steps comprise the step of sintering said fluorinated coatings of soot from one end to the other.

5. The method of claim 1 wherein said first fluorine level and said cross-sectional reduction in area of said intermediate preform is such that said predetermined value for said area weighted average index of refraction is within the range between 1.4454 and 1.4446.

6. The method of claim 5 wherein said lower concentration of fluorine is such that said other solid layer has an index of refraction that is lower than said average index of refraction by between 0.0035 and 0.0069.

7. The method of claim 1 further including, just prior to said area reduction step, determining if said intermediate preform average index of refraction is said predetermined value and, if not, dividing said intermediate preform into a plurality of segments and proceeding with said method, treating each of said segments as an intermediate preform until each of said segments has an area weighted average index of refraction which satisfies said predetermined value.

8. The method of claim 1 wherein said start rod comprises pure silicon dioxide.

9. A method of fabricating a glass preform from which optical fibers can be drawn comprising the steps of:

depositing on a starting rod of silicon dioxide a coating of porous glass soot of homogeneous composition and low water content;

dehydrating said coating of soot to reduce its water content;

fluorinating said coating of soot with a given concentration and partial pressure of fluorine while at an elevated temperature to remove water remaining after said dehydration step and to fill the pores of said soot with fluorine;

consolidating said fluorinated soot on said starting rod to form an intermediate preform with a solid glass layer doped with a predetermined percentage of fluorine;

drawing down said intermediate preform and repeating the first five steps if necessary starting with said intermediate preform until the area weighted average index of refraction of said starting rod material to said fluorine doped layer, or subsequent layers, added to said intermediate preform is a predetermined value such that said intermediate preform upon further drawing will act as an optical fiber core if surrounded by a cladding having the necessary index of refraction to promote waveguiding action;

depositing on said intermediate preform at least one other coating of porous glass soot of homogeneous composition and low water content;

dehydrating said other coating of soot to reduce its water content;

fluorinating said other coating of soot with a given concentration, lower than said first concentration, and partial pressure of fluorine while at an elevated temperature sufficient to remove any water remaining after dehydrating said other soot coating and to fill the pores of said other soot coating with a level of fluorine which, after consolidation of said final soot, results in a solid fluorinated layer having an index of refraction lower than that of said solid fluorinated layer of said intermediate preform; and consolidating said final soot on said intermediate preform to form over said intermediate preform a solid glass layer whose index of refraction is lower than the area weighted average index of refraction of said intermediate preform.

10. A method of fabricating a single mode optical fiber comprising the steps of:

depositing on a starting rod a coating of porous glass soot of homogeneous composition and low water content;

dehydrating said coating of soot to reduce its water content;

fluorinating said coating of soot with a given concentration and partial pressure of fluorine while at an elevated temperature to remove water remaining after said dehydration step and to fill the pores of said soot with fluorine;

consolidating said fluorinated soot on said starting rod to form an intermediate preform with a solid glass layer doped with a predetermined percentage of fluorine;

reducing the cross-sectional area of said intermediate preform and adding additional solid fluorine-containing layers according to the sequence above as required until the area weighted average index of refraction of said starting rod material to said fluorine doped layer, or layers subsequently added to said intermediate preform, is a predetermined value such that said intermediate preform upon further drawing under a predetermined draw down ratio will act as an optical fiber core when surrounded by a cladding having an index of refraction which in combination with said average index will sustain waveguiding action;

depositing on said intermediate preform at least one other coating of porous glass soot of homogeneous composition and low water content;

dehydrating said other coating of soot to reduce its water content;

fluorinating said other coating of soot with a given concentration, lower than said first concentration, and partial pressure, of fluorine while at an elevated temperature sufficient to remove any water remaining after dehydrating said other soot coating and to fill the pores of said other soot coating with a level of fluorine which, after consolidation of said final soot, results in a solid fluorinated layer having an index of refraction lower than that of said solid fluorinated layer of said intermediate preform; and consolidating said final soot on said intermediate preform to form over said intermediate preform a solid glass layer whose index of refraction is lower than the area weighted average index of refraction of said intermediate preform to form said preform; and drawing down said preform into a single mode optical fiber.

* * * * *